United States Patent [19]

Hapeman

[11] Patent Number: 5,661,378
[45] Date of Patent: Aug. 26, 1997

[54] TRACTIVE EFFORT CONTROL METHOD AND SYSTEM FOR RECOVERY FROM A WHEEL SLIP CONDITION IN A DIESEL-ELECTRIC TRACTION VEHICLE

[75] Inventor: Martin Jay Hapeman, Edinboro, Pa.

[73] Assignee: General Electric Company, Erie, Pa.

[21] Appl. No.: 542,496

[22] Filed: Oct. 13, 1995

[51] Int. Cl.⁶ ........................... H02P 3/00
[52] U.S. Cl. ........................... 318/52; 318/362
[58] Field of Search ............... 318/52, 86, 60, 318/63, 87, 821, 823, 362, 375, 376, 371, 380, 432; 188/112 R, 106 R, 107; 303/122.01, 122.05, 124, 138, 139

[56] References Cited

U.S. PATENT DOCUMENTS

| | | | |
|---|---|---|---|
| 3,764,867 | 10/1973 | Smith | 318/52 |
| 3,866,979 | 2/1975 | Rabus et al. | 188/181 |
| 4,035,698 | 7/1977 | Soderberg | 318/52 |
| 4,164,872 | 8/1979 | Weigl | 180/97 X |
| 4,401,035 | 8/1983 | Spigarelli et al. | 105/61 |
| 4,950,964 | 8/1990 | Evans | 318/52 |
| 5,163,170 | 11/1992 | Grabowski | 318/113 |

Primary Examiner—Jonathan Wysocki
Attorney, Agent, or Firm—Jill M. Breedlove; Marvin Snyder

[57] ABSTRACT

A wheel slip recovery method for a locomotive in which an internal combustion engine is connected in driving relationship to an electric power generator to supply electric power to a plurality of electric traction motors coupled to drive corresponding wheel-axle sets of the locomotive. The locomotive system includes a dynamic braking function in which an electrical resistance circuit is selectively coupled in parallel circuit arrangement with the generator for selectively receiving power from the traction motors during dynamic electrical braking. The inventive method detects a wheel slip condition which cannot be overcome by transfer of power from a slipping to a non-slipping wheel and selectively couples the dynamic braking resistance circuit into circuit with the power generator in a manner to reduce power supplied to the driven wheels to a level sufficient to allow the wheels to cease slipping without reducing power output from the generator.

7 Claims, 1 Drawing Sheet

W= SPEED FEEDBACK SIGNAL
I= CURRENT FEEDBACK SIGNAL
P= INVERTER POWER SIGNAL

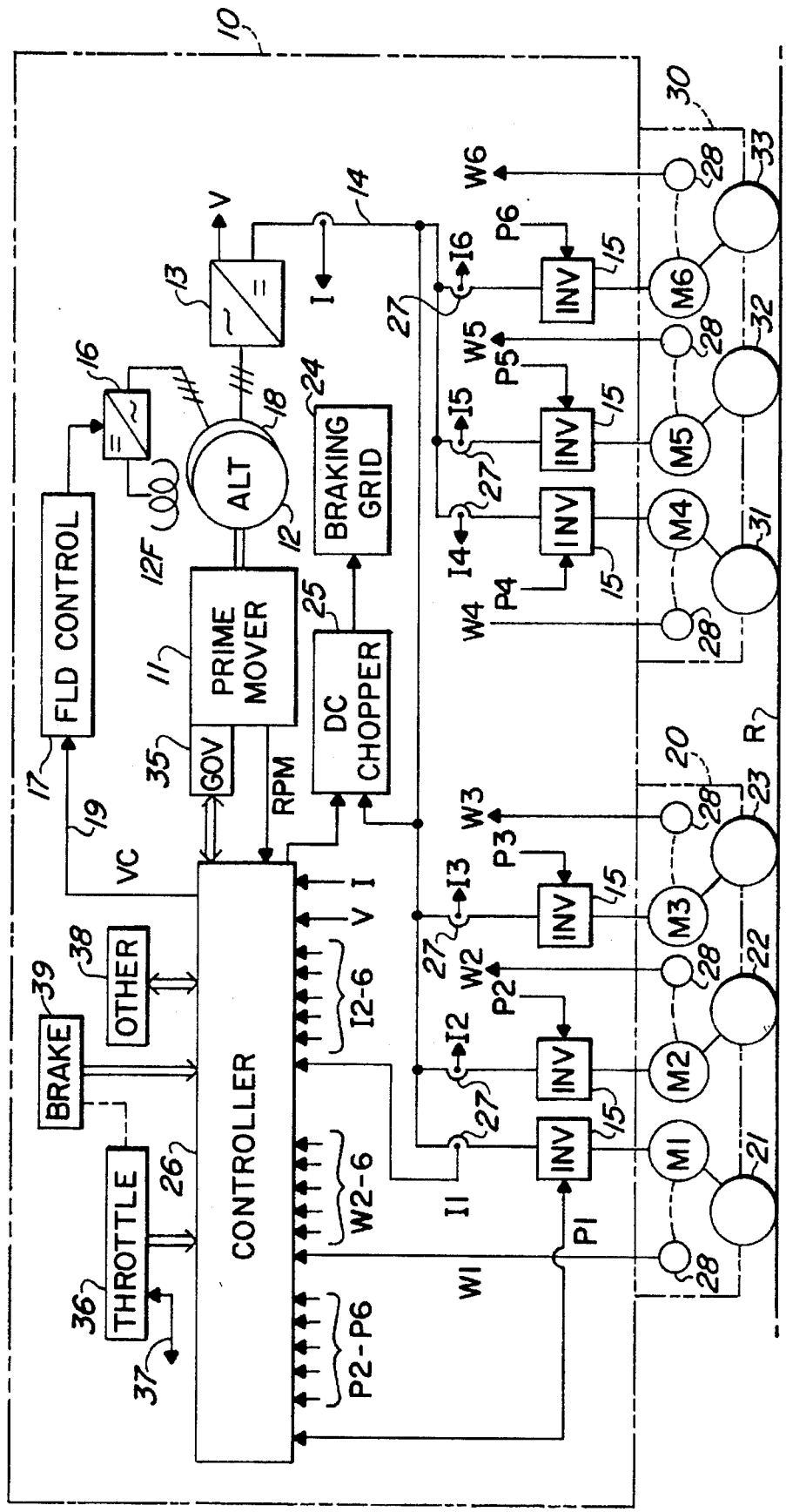

TRACTIVE EFFORT CONTROL METHOD AND SYSTEM FOR RECOVERY FROM A WHEEL SLIP CONDITION IN A DIESEL-ELECTRIC TRACTION VEHICLE

BACKGROUND OF THE INVENTION

The present invention relates to control systems for electric motor powered traction vehicles such as locomotives or transit vehicles and, more particularly, the invention relates to a method for controlling such a vehicle in a manner to improve recovery from a wheel slip during propulsion operation.

Locomotives and transit vehicles as well as other large traction vehicles are commonly powered by electric traction motors coupled in driving relationship to one or more axles of the vehicle. Locomotives and transit vehicles generally have at least four axle-wheel sets per vehicle with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Good adhesion between each wheel and the surface is required for efficient operation of the vehicle.

It is well known that maximum tractive or braking effort is obtained if each powered wheel of the vehicle is rotating at such an angular velocity that its actual peripheral speed is slightly higher (motoring) than the true vehicle speed (i.e., the linear speed at which the vehicle is traveling, usually referred to as "ground speed" or "track speed"). The difference between wheel speed and track speed is referred to as "slip speed." There is a relatively low limit value of slip speed at which peak tractive effort is realized. This value, commonly known as maximum "creep speed," is a variable that depends on track speed and rail conditions. So long as the maximum creep speed is not exceeded, slip speed is normal and the vehicle will operate in a stable microslip or creep mode. If wheel-to-rail adhesion tends to be reduced or lost, some or all of the vehicle wheels may slip excessively, i.e., the actual slip speed may be greater than the maximum creep speed. Such a wheel slip condition, which is characterized in the motoring mode by one or more spinning axle-wheel sets, can cause accelerated wheel wear, rail damage, high mechanical stresses in the drive components of the propulsion system, and an undesirable decrease of tractive effort.

Many different systems are disclosed in the prior art for automatically detecting and recovering from undesirable wheel slip conditions.

Typically, differential speeds between axle-wheel sets or rate of change of wheel speed or a combination of these two measurements are used to detect wheel slip. Speed is monitored and if found to exceed predetermined differentials or rates of change, power to the motors is reduced in an attempt to bring speed to a value at which traction is regained. Once traction is regained, an attempt is made to reapply power to the motors to return the locomotive to the same conditions as existed prior to the on-set of wheel slip. However, in a conventional diesel-electric locomotive, removing power from the motors results in unloading of the diesel engine and a concurrent drop in power output of the engine and the speed of its associated turbocharger. When an attempt is made to reapply power at the previous level, there is a significant time delay to recover engine power, typically because the turbocharger has to be accelerated to operating speed. While a wheel slip condition can be overcome rapidly by power reduction, the time delay in engine recovery allows the vehicle speed to drop. As a consequence, the application of the same power to the motors is more likely to cause the wheels to lose adhesion and resume slipping since tractive effort is proportional to power divided by speed and the reduced speed requires a higher tractive effort. In some instances, the process of removing and reapplying power can result in locomotive speed ratcheting down to a stall condition. While this process can be overcome in most instances by allowing power to ramp up, ramping power is not practical on hills (where most slips occur) since higher power is needed to move the locomotive and power reduction results in speed reduction which can further lower the wheel speed at which slippage occurs. Thus, it is desirable to provide a method to avoid delays in reapplying power after occurrence and recovery of a wheel slip.

SUMMARY OF THE INVENTION

Among the several objects of the present invention may be noted the provision of a control method for an electric traction motor vehicle which provides faster response when wheel-to-rail adhesion is reduced and which enhances the available tractive effort. In an exemplary form, the invention is illustrated as a method for detecting wheel slip in an electric alternating current induction motor powered vehicle, the vehicle being operated so as to divert the excess available power into the braking resistance. Consequently, the prime mover does not recognize a power reduction and continues to operate at the same power level as before the wheel slip occurred. When the slipping wheel regains traction, power is immediately available to apply to the motor driving the slipping wheel. Such power can be smoothly reapplied by phasing back the switching arrangement to smoothly reduce the power diverted to the braking resistance.

BRIEF DESCRIPTION OF THE DRAWINGS

For a better understanding of the present invention, reference may be had to the following detailed description taken in conjunction with the accompanying drawings in which:

FIG. 1 is a schematic representation of the principal components of a propulsion system for a six-axle locomotive.

DETAILED DESCRIPTION OF THE INVENTION

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The 3-phase voltages generated by the main alternator 12 are applied to a-c input terminals of at least one 3-phase, double-way uncontrolled power rectifier bridge 13. The direct current (d-c) output of the bridge 13 is electrically coupled, via a d-c bus 14 to each of a plurality of d-c to a-c inverters 15 which invert the d-c power to controlled frequency a-c power. Each of the inverters 15 is coupled in energizing relationship to a corresponding one of a plurality of adjustable speed a-c traction motors M1 through M6. Prime mover 11, alternator 12, and rectifier bridge 13 are suitably mounted on the platform of a self-propelled traction vehicle 10 which typically is a 6-axle diesel-electric locomotive. The locomotive platform is in turn supported on two trucks 20 and 30, the first truck 20 having three axle-wheel sets 21, 22 and 23 and the other truck 30 also having three axle-wheel sets 31, 32 and 33.

Each axle-wheel set of the locomotive comprises a pair of flanged wheels affixed to opposite ends of an axle. All six pairs of wheels travel on a surface provided by a pair of parallel, spaced-apart rails, one of which is illustrated by the line R in FIG. 1. Each of the traction motors M1–M6 is hung on a separate axle, and its armature is mechanically coupled, via conventional gearing (not shown), in driving relationship to the associated axle-wheel set. Suitable current transducers 27 are used to provide a family of six current feedback signals I1 through I6 that are respectively representative of the magnitudes of motor current, and suitable speed sensors 28 are used to provide a family of six speed feedback signals W1 through W6 that are respectively representative of the rotational speeds (revolutions per minute, or "rpm") of the motor shafts and hence of the separately driven axle-wheel sets. The controller 26 also provides a family of output signals P1–P6 to the inverters 15 which establish the conduction times of a plurality of electric valves (not shown) which form the inverters 15. The inverters 15 typically include integral gate pulse generators (not shown) which respond to the conduction command signals P1–P6 by generating appropriate gate pulse signals to control the conduction times of the electric valves. The valves may be, for example, gate turn-off devices or insulated gate bipolar transistors.

The main alternator 12 and the rectifier bridge 13 serve as a controllable source of electric power for the respective traction motors. The magnitude of output voltage (or current) of this source is determined and varied by the amount of excitation current supplied to field windings 12F on the rotor of the main alternator. The alternator field excitation current is supplied by a 3-phase controlled rectifier bridge 16 the input terminals of which receive alternating voltages from a prime mover-driven auxiliary alternator 18 that can actually comprise an auxiliary set of 3-phase windings on the same frame as the main alternator 12. Conventional control or regulating means 17 is provided for varying the magnitude of direct current that the controlled rectifier bridge 16 supplies to the alternator field (and hence the output of the alternator 12) in accordance with a variable control signal VC on an input line 19. The control signal VC is provided by a controller 26 which is operative to vary VC as necessary to minimize any difference between a reference signal (the value of which normally depends on the value of a variable command signal) and a feedback signal representative of the actual value of the quantity being regulated. The system includes suitable means for deriving a voltage feedback signal V representative of the average magnitude of the rectified output voltage of the main alternator, which magnitude is a known function of the field current magnitude and also varies with the speed of the prime mover 11.

The prime mover 11 is a thermal or internal-combustion engine or equivalent. On a diesel-electric locomotive, the motive power is typically provided by a high-horsepower, turbocharged, 16-cylinder diesel engine. Such an engine may have a fuel system (not shown) that includes a pair of fuel pump racks for controlling how much fuel oil flows into each cylinder each time an associated fuel injector is actuated by a corresponding fuel cam on the engine crankshafts. The position of each fuel rack, and hence the quantity of fuel supplied to the engine is controlled by an output piston of an engine speed governor 35. The governor regulates engine speed by automatically displacing the racks, within predetermined limits, in a direction and by an amount that minimizes any difference between actual and desired speeds of the engine crankshaft. The desired speed is set by a variable speed call signal received from the controller 26. Other engines may have electronically controlled fuel systems eliminating many of the mechanical parts described above but performing equivalent functions.

In a normal motoring or propulsion mode of operation, the value of the engine speed call signal is determined by the position of a handle of a manually operated throttle 36 to which the controller 26 is coupled. A locomotive throttle conventionally has eight power positions or notches (N), plus idle and shutdown. N1 corresponds to a minimum desired engine speed (power), while N8 corresponds to maximum speed and full power. In a consist of two or more locomotives, only the lead unit is usually attended, and the controller onboard each trail unit will receive, over a trainline 37, an encoded signal that indicates the throttle position selected by the operator in the lead unit. The eight discrete power notches described above may be replaced by a continuously variable controller.

For any power level of the engine there is a corresponding desired load. The controller 26 is suitably arranged to translate the throttle power level information into a reference signal value substantially equal to the value that the voltage feedback signal V will have when the traction power matches the called-for power, and so long as the alternator output voltage and load current are both within predetermined limits the control signal VC on the input line 19 of the field controller 17 is varied as necessary to obtain this desired load. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

The controller 26 receives voltage feedback signal V, current feedback signals I1–I6, axle/wheel speed feedback signals W1–W6, another current feedback signal I representative of the magnitude of the rectified output current of the main alternator 12, an engine speed signal RPM indicating the rotational speed of the engine crankshaft, a load control signal issued by the governor 35 if the engine cannot develop the power demanded and still maintain the called-for speed, and relevant data from other selected inputs 38. (The load control signal is effective, when issued, to reduce the value of the reference signal in the controller 26 so as to weaken the alternator field until a new balance point is reached.)

In an electrical braking or retarding mode of operation, inertia of the moving vehicle is converted into electrical energy by utilizing the traction motors as generators. To configure the propulsion system for braking, the throttle-handle is moved to its idle position, an interlocking handle of a brake control device 39 is moved from an off position, through a set-up position, to various on positions, and the traction motors M1–M6 are connected to an appropriate load circuit which, in the case of dynamic braking, typically comprises an array of fan-blown resistor grids 24 coupled to d-c link or bus 14 via a d-c chopper 25. The d-c chopper 25 is a conventional chopper circuit which can be controlled by controller 26 to regulate the amount of power applied to grid 24. The grid 24 is used to dissipate electrical energy generated by the motors in the form of heat. During electrical braking or retarding, the controller 26 is operative to vary the alternator field excitation so that at relatively high track speeds (e.g., higher than approximately 20 mph) the average magnitude of motor current supplied to the resistor grids (and hence braking effort) is regulated to a reference value that depends on the setting of the brake handle, whereas at lower track speeds, whenever maximum rated current is reached in the motor, the alternator output current is held constant at this limit and braking current will decrease linearly with speed.

In the present invention, the controller 26 is operative in the motoring or propulsion mode in response to a wheel slip detection to operate the d-c chopper 25 without transitioning the propulsion system into an electrical retarding mode of operation. In the wheel slip mode, the power output of the prime mover 11 is maintained at its last set level by maintaining the electrical power output of the alternator 12 at its last set level. The controller 26 adjusts the value of the appropriate one of the signals P1–P6 to reduce power to the corresponding one of the slipping wheels 21–23, 31–33. Concurrently, controller 26 operates chopper 25 to divert excess power into resistance grid 24, the excess power being the amount of power reduction to the motor driving the slipping wheel. From the viewpoint of the alternator 12, power demand remains constant and the prime mover 11 continues operation without power reduction.

When the controller 26 senses that the slipping wheel has regained traction, power is immediately available by concurrently phasing back operation of the chopper 25 while increasing the appropriate one of the power command signals P1–P6. Accordingly, the system overcomes the time delay characteristic of prior art wheel slip systems.

While the invention is disclosed in conjunction with an a-c motor system, it will be apparent that the invention is applicable to a d-c motor propulsion system. In a d-c motor propulsion system, the d-c motors corresponding to a-c motors 21–23, 31–33 are typically connected in parallel to the d-c link 14. Thus, operation of the chopper 25 will reduce power to all of the d-c motors. While such power reduction is not atypical in wheel slip systems for d-c motor systems, it would be preferable to provide individual control of the d-c motors. In systems using separately excited d-c motors, the controller 26 includes systems for regulating motor field current. Accordingly, each d-c motor can be individually controlled by field current regulation and the present invention would be operative to allow fast wheel slip recovery in a d-c motor system.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for improving tractive effort control in a diesel electric locomotive subsequent to a wheel slip condition, the locomotive having a plurality of driven wheels operative by association with a corresponding one of a plurality of electric traction motors, the method comprising the steps of:

detecting an on-set of a wheel slip condition;

diverting, in response to said step of detecting, at least some power from the motors into a power dissipation circuit, the power dissipation circuit comprising a resistance coupled in series circuit with a power regulating circuit, the series connected resistance and regulating circuit being coupled in parallel circuit with the traction motors; and controlling the power regulating circuit to selectively vary the magnitude of power being diverted in a manner to maintain a maximum level of tractive effort by maximizing the magnitude of power applied to the motors associated with the slipping wheel at a value which produces a maximum available torque without wheel slip.

2. The method of claim 1 wherein each of said motors comprises an alternating current (AC) electric motor and said step of detecting includes the step of determining wheel slip of a plurality of wheels.

3. The method of claim 2 wherein a wheel slip condition of a single wheel occurs and said step of diverting includes the step of reducing power to said single wheel and applying an amount of power equivalent to the amount reduced at said single wheel to other wheels of the locomotive.

4. The method of claim 3 wherein power to non-slipping wheels of the locomotive is maintained at a value just below an on-set of wheel slippage and additional power available from said step of reducing is diverted into said power dissipation circuit.

5. A wheel slip recovery method for a locomotive in which an internal combustion engine is connected in driving relationship to an electric power generator, the generator being coupled to supply electric power to a plurality of electric traction motors coupled to drive corresponding wheel-axle sets of the locomotive, each wheel-axle set including a drive wheel in contact with a rail, and an electrical resistance circuit selectively coupled in parallel circuit arrangement with the generator for selectively receiving power therefrom, the resistance circuit comprising an electrical braking grid connected in series circuit with a chopper circuit, the method comprising the steps of:

detecting a wheel slip condition which cannot be overcome by transfer of power from a slipping to a non-slipping wheel;

selectively coupling the resistance circuit into circuit with the power generator in a manner to reduce power supplied to the driven wheels to a level sufficient to allow the wheels to cease slipping without reducing power output from the generator, including operating the chopper circuit to divert an amount of power into the braking grid corresponding to an amount of power reduction to the driven wheels; and gradually decoupling the resistance output of circuit with the generator so as to return full power to the driven wheels.

6. A tractive effort control system for a diesel electric locomotive in which an internal combustion engine is connected in driving relationship to an electric power generator, the generator being coupled to supply electric power to a plurality of electric traction motors coupled to drive corresponding wheel-axle sets of the locomotive, each wheel-axle set including a drive wheel in contact with a rail, and an electrical resistance circuit selectively coupled in parallel circuit arrangement with the generator for selectively receiving power therefrom, the resistance circuit comprising a resistance connected in series circuit with a power regulating circuit, comprising:

wheel slip detecting means for detecting a wheel slip condition which cannot be overcome by transfer of power from a slipping to a non-slipping wheel;

control means responsive to said wheel slip detecting means for operating in a wheel slip mode by diverting at least some power from the motors into the resistance circuit, the series connected resistance and regulating circuit being coupled in parallel circuit with the traction motors, said control means controlling the power regulating circuit to selectively vary the magnitude of power being diverted in a manner to maintain a maximum level of tractive effort by maximizing the magnitude of power applied to the motors associated with the slipping wheel at a value which produces a maximum available torque without wheel slip.

7. The tractive effort control system of claim 6 wherein said control means further comprises means for gradually decoupling the resistance output of circuit with the generator so as to return full power to the driven wheels.

* * * * *